United States Patent [19]
Douglas et al.

[11] 3,881,128
[45] Apr. 29, 1975

[54] ELECTRICAL LOAD CONTROL FOR A MOTOR VEHICLE

[76] Inventors: Carl L. Douglas, 1220 Fox Hill Dr., Indianapolis, Ind. 46208; Timothy Smith, 3514 N. Riley Ave., Indianapolis, Ind. 46218; Richard W. Crenshaw, 1210 Fox Hill Dr., Indianapolis, Ind. 46208

[22] Filed: Feb. 20, 1974

[21] Appl. No.: 443,966

[52] U.S. Cl. ............................. 315/83; 307/10 LS
[51] Int. Cl. ............................................. B60q 1/02
[58] Field of Search ............ 315/82, 83; 307/10 LS; 340/56, 76

[56] References Cited
UNITED STATES PATENTS

| | | | |
|---|---|---|---|
| 3,389,296 | 6/1968 | Carruth | 315/82 X |
| 3,601,796 | 8/1971 | Mortimer | 340/56 X |
| 3,748,529 | 7/1973 | Ballou | 315/83 |

*Primary Examiner*—James B. Mullins
*Attorney, Agent, or Firm*—Woodard, Weikart, Emhardt & Naughton

[57] ABSTRACT

A power control for an electrical load, such as exterior lighting, in a motor vehicle. Electrical power is provided to the load circuit through the contacts of a relay which is activated when the motor vehicle ignition is on. When the ignition is off, and the load circuit is coupled to the relay contacts, the relay is activated through an alternative circuit path which includes two transistor switches in series. A timing circuit is operable to turn off one of these transistors when a predetermined time has elapsed after the activation of the relay.

8 Claims, 2 Drawing Figures

ELECTRICAL LOAD CONTROL FOR A MOTOR VEHICLE

BACKGROUND OF THE INVENTION

1. Field of the Invention

The invention is in the field of electrical load devices and systems in a motor vehicle.

2. Description of the Prior Art

Several systems have been proposed for controlling the application of electrical power to electrical load circuits in a motor vehicle. Most of such systems have been proposed to control the exterior lighting of the motor vehicle, and have had certain common characteristics. Most notable is the fact that, in most of these systems, the vehicle exterior lighting must be turned off manually, and when the vehicle exterior lighting is manually switched off, the exterior lights remain on for a predetermined short period of time. Control systems having these characteristics are disclosed in U.S. Pat. No. 3,476,975 to Brock, U.S. Pat. No. 3,374,394 to Miller, U.S. Pat. No. 3,546,527 to Chunn, and U.S. Pat. No. 3,544,838 to Carruth.

A motor vehicle light control system which deactivates the vehicle lights after its ignition is turned off is disclosed in U.S. Pat. No. 3,388,288 to Kibler. In the Kibler system, two relays are utilized, the contacts of one in series with the coil of the other, and the shutoff action for the vehicle lighting takes place after a specified time delay.

Means for activating the exterior lighting circuits of a motor vehicle in response to an on condition of the motor vehicle ignition switch are disclosed in U.S. Pat. No. 3,497,708 to Daugherty. The Daugherty systems do not include time-delay circuitry for shutting off the vehicle lights, however.

In response to the need for apparatus to deactivate a motor vehicle electrical load circuit after the motor vehicle ignitiion switch is turned off, including means for activating the electrical load circuit for a predetermined time after ignition shutoff, if desired, apparatus according to the present invention has been provided.

SUMMARY OF THE INVENTION

One embodiment of the present invention is a power control for an electrical load in a motor vehicle comprising a motor vehicle electrical load circuit, control means, having a control input, a load input and an output, the load input being coupled to a source of electrical power, for coupling its output to its load input when its control input is coupled to a source of electrical power, a first switch operable in a first position to couple the control input of the control means to a source of electrical power and in a second position to decouple the control input of the control means from a source of electrical power, a second switch operable in a first position to couple the output of the control means to the load circuit and in a second position to decouple the output of the control means from the load circuit, first circuit means for coupling a source of electrical power to the control input of the control means when the second switch is in its first position and the first switch is in its second position, and timing circuit means for precluding the coupling by the first circuit means after the control means has coupled its output to a source of electrical power for a predetermined period of time.

It is an object of the present invention to provide a power control for an electrical load in a motor vehicle which will disconnect the load from a source of electrical power when the motor vehicle ignition is turned off, and at the same time allow an operator of the motor vehicle to energize the electrical load for a predetermined time with de-energization of the load occurring automatically after the predetermined time.

Further objects and advantages of the present invention shall be apparent from the following detailed description and accompanying figures.

DESCRIPTION OF THE PREFERRED EMBODIMENT

Figure 1:
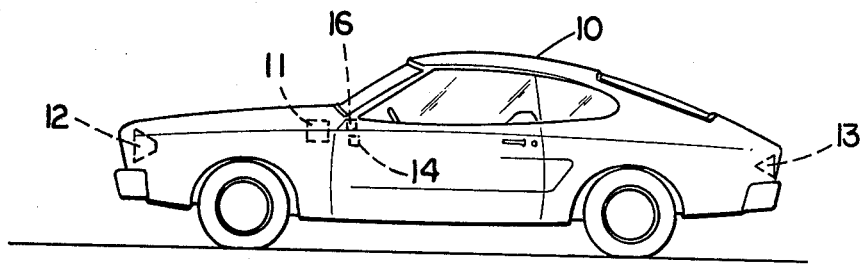
FIG. 1 is a side view of a motor vehicle including a control according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to FIG. 1, there is shown a motor vehicle 10 including an electrical power control 11 according to the present invention. Control 11 is mounted to the fire wall of motor vehicle 10 and is electrically connected to standard headlight switch 16 and ignition switch 14 as well as headlights 12 and taillights 13.

Figure 2:
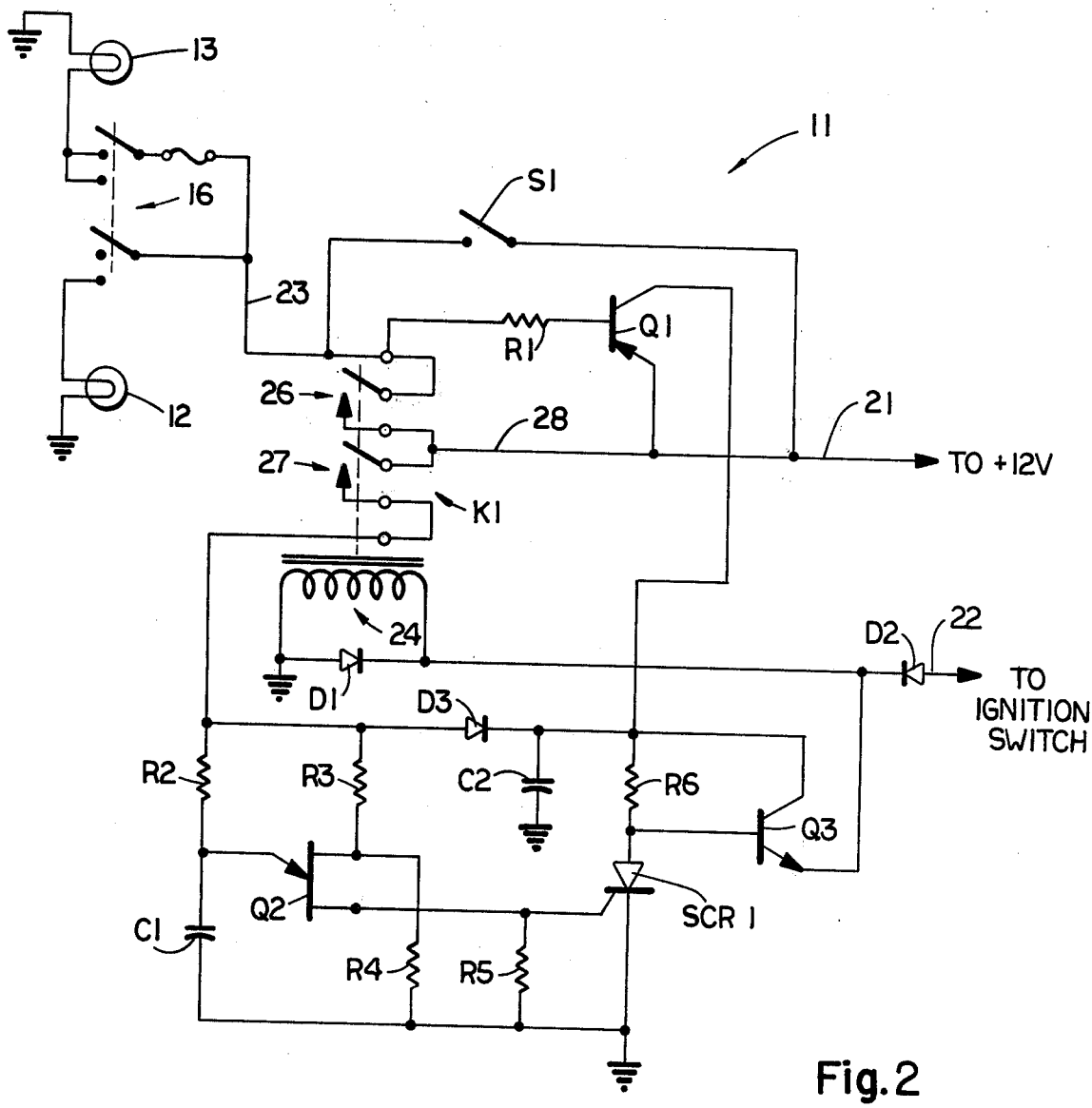
FIG. 2 is a schematic diagram of a control circuit according to the present invention.

In FIG. 2, control circuit 11 is shown along with its connection to the lighting circuit of motor vehicle 10. Lead 21 is coupled to a source of electrical power such as the positive 12 volt terminal of the battery of motor vehicle 10. Lead 22 is coupled to the ignition switch 14 of motor vehicle 10 at a terminal which is energized to the positive potential of approximately 12 volts when the ignition switch of motor vehicle 10 is turned on. Lead 23 connects the control circuit 11 to the lighting circuit of motor vehicle 10, including light switch 16, headlights 12 and taillights 13.

There may be many variations in the switching and circuit-protection areas of the vehicle lighting circuit, of course. For example, the fuse shown in series with the taillights 13 may be replaced by a circuit breaker or eliminated with the provision of circuit protection incorporated in switch 16. Appropriate overload protection may also be provided for headlights 12. The essential connections for the present embodiment are that of lead 21 to the motor vehicle B+ and lead 23 to the light switch terminal as shown. For the purposes of this description, switch 16 shall be considered closed when lead 23 is coupled to either the headlights 12, taillights 13 or both, and open when lead 23 is coupled to neither the headlights 12 nor the taillights 13.

Manual override switch Sl is provided to bypass control circuit 11 and serves to couple the positive 12 volts of the motor vehicle electrical power source to light switch 16 directly; whereas, when switch Sl is open, the control circuit 11 is interposed between the electrical power source and light switch 16, which is the standard manual light switch of the motor vehicle. The other two connections required for the control circuit 11 are, as mentioned, lead 22 to the appropriate ignition switch terminal and a ground connection.

In operation, control 11 provides two alternate paths to energize coil 24 of relay Kl, with the energization of relay Kl closing relay contacts 26 and 27 and coupling electrical power through leads 21 and 28 to headlight switch 16. One path for energizing relay Kl is from ignition switch 14, through lead 22 and diode D2 to relay coil 24; and the other path is from the motor vehicle power source through lead 21, transistor Ql and transistor Q3 to relay coil 24.

When ignition switch 14 is turned on, relay coil 24 is energized through diode D2 and lead 22 from the ignition switch. The energization of relay coil 24 closes relay contacts 26 and 27. This couples electrical power through leads 21 and 28 and relay contacts 26 and 27. Capacitor Cl begins to charge, at a rate primarily dependent upon the time constant of R2 and Cl. Also the base of transistor Ql is coupled through resistor Rl to a positive 12 volts and Ql is biased off. A positive 12 volts is also coupled through lead 23 to the terminals of light switch 16. During this time when the ignition switch is on, light switch 16 may be operated normally to turn headlights 12 and taillights 13 on or off manually.

In the timing portion of control 11, while power from the ignition switch holds contacts 26 and 27 closed, capacitor Cl charges to the level necessary to trigger unijunction transistor Q2, and the firing of unijunction transistor Q2 gates on SCRl, grounding the base of transistor Q3. Prior to the grounding of the base of transistor Q3, transistor Q3 has been non-conductive due to the positive potential of about 12 volts present at both its collector and emitter.

After the ignition system of motor vehicle 10 has been energized for the period of time necessary to gate SCRl on, control 11 operates to deenergize lights 12 and 13 of motor vehicle 10 when ignition switch 14 is turned to the off position. When the ignition of motor vehicle 10 is turned off, power is no longer coupled through lead 22 and relay coil 24 is no longer energized. Since SCRl has been gated on, the base of transistor Q3 is grounded and Q3 will not conduct to provide power through the alternate circuit for relay coil 24. Therefore, when the ignition is turned off, relay coil 24 is deenergized and relay contacts 26 and 27 open, removing power from light switch 16. Whether light switch 16 is open or closed, the lights will be deenergized.

If, when the ignition is turned off, light switch 16 is closed, the base of Ql is grounded through Rl and lights 12 and 13. Since the emitter of Ql is at +12 volts, Ql conducts B+ from lead 21 through R6 and SCRl to ground. Q3 is turned off since SCRl is conducting, grounding the base of Q3, and therefore relay coil 24 of relay Kl remains deenergized.

If light switch 16 is open at the time the ignition is turned off, Ql is nonconductive since there is no ground for the base of Ql through the light filaments. Therefore, when light switch 16 is open at the time that the ignition is turned off, no current is drawn through Ql, R6 and SCRl after the ignition is off. In any event, R6 is chosen at a value of about 430 ohms and the current drain required to maintain lights 12 and 13 off even if light switch 16 is on is only in the order of about 30 milliamps.

In addition to assuring that the lights 12 and 13 of motor vehicle 10 are deenergized when ignition switch 14 is turned off, whether light switch 16 is off or on, control 11 also provides means for obtaining lighting from the vehicle lights for a predetermined period of time, at the end of which time, the lights are turned off by control 11.

In order to energize lights 12 and 13 for a fixed period of time after ignition switch 14 has been turned off, light switch 16 must be moved from an open position to a closed position. If, when ignition 14 is turned off, light switch 16 is open, then closing switch 16 energizes lights 12 and 13 for the fixed period. If, when ignition 14 is turned off, light switch 16 is closed, light switch 16 must be opened and then reclosed to energize lights 12 and 13 for the fixed time period.

With light switch 16 open and ignition switch 14 off, no power is provided through ignition switch 14 to line 22. In addition, transistor Ql is nonconductive since the base of transistor Ql is ungrounded by the opening of switch 16. Therefore, SCRl is turned off, since no power is available through R6 to the anode of SCRl. When switch 16 is now closed, after SCRl has turned off, Ql is turned on and power is coupled through Ql to Q3. Since SCRl is now nonconductive, the potential on the base of Q3 (anode of SCRl) turns Q3 on and the B+ is coupled through Ql and Q3 to relay coil 24, energizing relay Kl and closing its contacts 26 and 27. Lights 12 and 13 are now energized through switch 16, lead 23, relay contacts 26, lead 21 and the motor vehicle B+. At the same time, capacitor Cl begins to charge through resistor R2 due to the closing of relay contacts 27. As described earlier, when Cl charges to a sufficient potential, unijunction transistor Q2 turns on, SCRl is gated on, and the base of Q3 is grounded, opening up the alternate power path through Ql and Q3 which has been energizing relay coil 24. Relay contacts 26 and 27 then open, lights 12 and 13 are de-energized, and a small current on the order of 30 milliamps is drawn through Ql, R6 and SCRl, holding the base of Q3 at ground preventing the energization of relay Kl.

In the occasional situation where ignition switch 14 is turned off while light switch 16 is closed and before capacitor Cl has charged to the necessary potential to fire unijunction transistor Q2 and gate SCRl on (Ql being on due to the light switch 16 being closed), relay Kl will be held on through the alternate path of Ql and Q3 for the remainder of the charging time of Cl untill SCRl is gated on. Thereafter, the operation of control 11 will be the same as if, with headlight switch 16 on, the ignition had been turned off at a time after the firing of transistor Q2, as described above.

Relay coil 24 presents a resistance of approximately 120 ohms at 12 volts, and the contacts of relay Kl are rated at approximately 10 amps. The charging time for capacitor Cl is dependent upon its value and the value of resistor R2, and resistor R2 may be a variable resistor to allow adjustment of the time delay period to that sufficient for the driver to get out of his car, secure it, and enter his house, before the lights turn off, for example.

While there have been described above the principles of this invention in connection with specific apparatus, it is to be clearly understood that this description is made only by way of example and not as a limitation in the scope of the invention.

What is claimed is:

1. A power control for an electrical load in a motor vehicle comprising:
   a motor vehicle electrical load circuit;
   control means, having a control input, a load input and an output, the load input being coupled to a source of electrical power, for coupling its output to its load input when its control input is coupled to a source of electrical power;
   a first switch operable in a first position to couple the control input of the control means to a source of electrical power and in a second position to decouple the control input of the control means from a source of electrical power;
   a second switch operable in a first position to couple the output of the control means to the load circuit and in a second position to decouple the output of the control means from the load circuit;
   first circuit means, responsive to the positioning of the second switch and coupled from the second switch, for coupling a source electrical power to the control input of the control means in response to the condition of the positioning of the second switch in its first position when the first switch is in its second position; and
   timing circuit means for precluding the coupling by the first circuit means after the control means has coupled its output to a source of electrical power for a predetermined period of time.

2. The control of claim 1 in which the load circuit comprises an exterior lighting circuit.

3. The control of claim 2 in which the first switch is the motor vehicle ignition switch and the second switch is a switch in series with the motor vehicle exterior lighting circuit.

4. The control of claim 3 in which the control means is a relay.

5. The control of claim 4 in which the first circuit means includes a first transistor which is conductive when the second switch is in its first position.

6. The control of claim 5 in which the first circuit means includes a second transistor, in series with the first transistor, which is conductive when the first switch is in its second position.

7. The control of claim 6 in which the timing circuit means includes an SCR, whose anode is coupled to the base of the second transistor of the first circuit means and whose cathode is coupled to ground, and a resistor-capacitor charging network coupled from the output of the control means to the gate of the SCR, the charging network charging to a sufficient level after the predetermined time to gate the SCR on, precluding conduction of the second transistor of the first circuit means.

8. The control of claim 7 in which the charging network of the timing circuit means is coupled to the gate of the SCR through a unijunction transistor.

* * * * *